G. W. Perry,
Steam Pump.

Nº 82,548. Patented Sep. 29, 1868.

Witnesses:

Inventor.
G. W. Perry

United States Patent Office.

GEORGE W. PERRY, OF SHENANDOAH CITY, PENNSYLVANIA.

Letters Patent No. 82,548, dated September 29, 1868.

IMPROVEMENT IN STEAM-PUMPING ENGINES.

The Schedule referred to in these Letters Patent and making part of the same.

TO ALL WHOM IT MAY CONCERN:

Be it known that I, GEORGE W. PERRY, of Shenandoah City, in the county of Schuylkill, and State of Pennsylvania, have invented a new and useful Improvement in Pumping-Engines; and I do hereby declare that the following is a full, clear, and exact description thereof, which will enable those skilled in the art to make and use the same, reference being had to the accompanying drawings, forming part of this specification.

This invention relates to improvements in engines used for raising water from mines, and especially designed to be applied to what is known as the "Cornish pumping-engine," whereby many of the objections to that engine are obviated.

And the invention consists in providing means, in combination with the valve-motion, for preventing damage from the accidents which frequently occur in that class of pumping-engines, and which will be hereinafter more fully described.

Similar letters of reference indicate corresponding parts.

Figure 1:
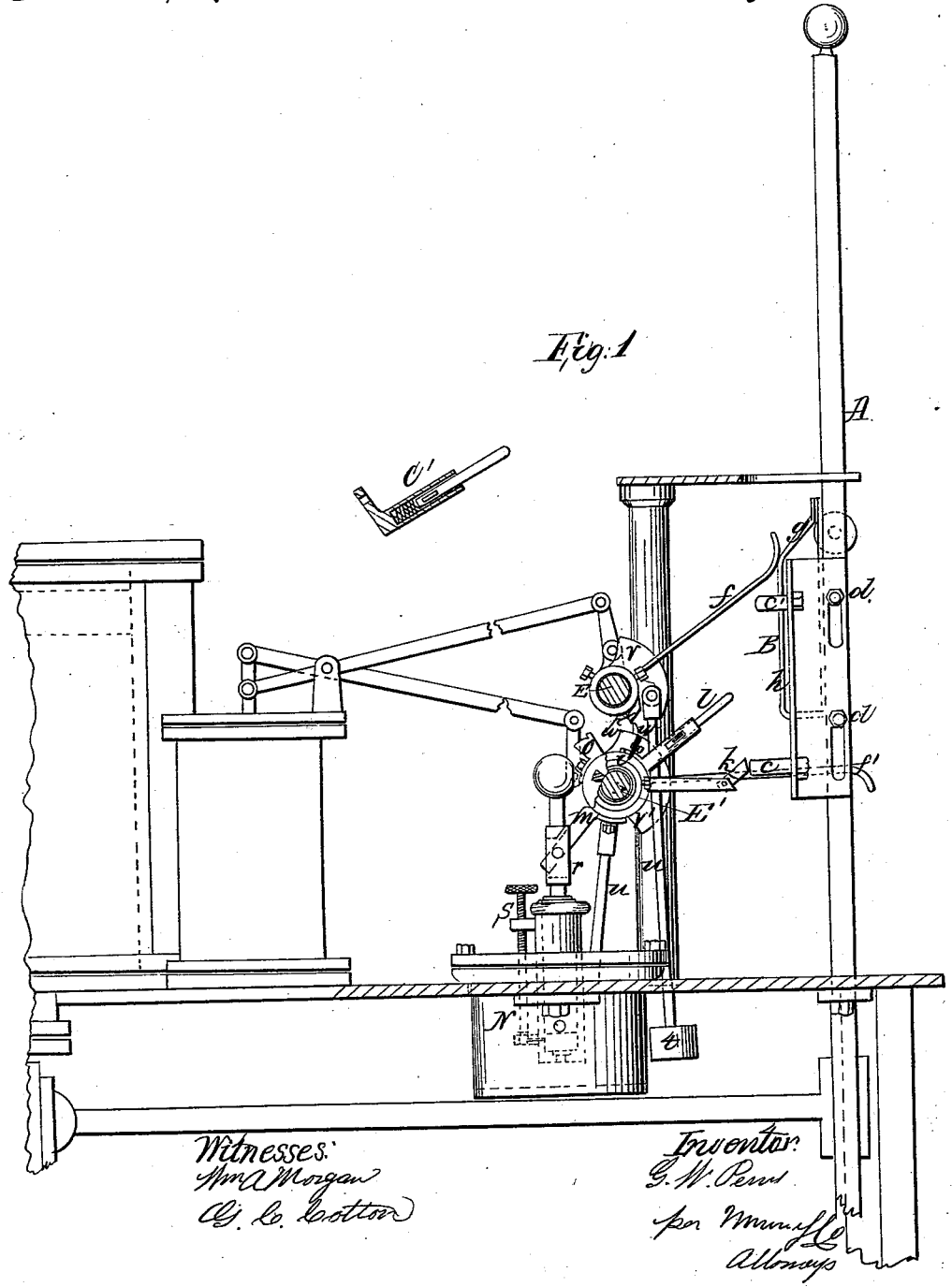
Figure 1 is a sectional elevation of my arrangement, showing a portion of the pump-rod and steam-engine, the latter being shown in red lines, the section being through the line $x\ x$ of fig. 2.

The Cornish pumping-engine is used chiefly for raising water from deep pits or mines, and the power of the steam is mainly applied to raising the pump-rod or bar.

This bar is usually constructed of square timber, well ironed, and its length corresponds with the depth of the mine, which is three or four hundred, and frequently more, feet.

This bar is connected with the cross-head of the engine, and its weight is sufficient to produce the reverse stroke of the engine, and to force up the water without any application of steam for that purpose.

Different causes tend to produce an unsteady motion of the engine, the principal of which is the only partial filling of the pump-barrel at the bottom of the mine, in which case the bar drops without sufficient resistance, and not unfrequently produces effects disastrous to the machinery.

For the purpose of providing a stop, as well as a regulating-motion, for the engine, I have invented the machinery seen in the drawing, and which I will proceed to describe.

The steam-cylinder, valve-chest, and valve-rods or levers are seen in red in the drawing, and require no description, as my improvement is only designed to operate upon the valves through the levers seen.

A is a vertical rod, which is attached to the cross-head of the steam-engine, and moves with it.

B is an adjustable frame on the rod, having tappets, $c\ c'$, attached to it, which frame is fastened to the bar A by the bolts $d\ d$.

E E' represent two rock-shafts, one of which, E, operates by its movement the induction-valve of the steam-engine, and the other, E', operates the exhaust or eduction-valve, through the movement of the bar A, acting upon the arms $f\ f'$.

The steam-valves are operated by this movement.

As seen in fig. 1, the bar is raised and the induction-port of the engine is closed, which always takes place when the arm $f$ is up, as seen, as the position of the arms $f\ f'$ governs the position of the rock-shafts E E', to which they are attached.

The valve-levers, which are seen in red, are attached to the rock-shafts by short arms, and the steam for actuating the engine is governed by their movement.

The frame B has an inclined surface, $g$, formed by the strap $h$, which comes in contact with the arm $f$, and raises it so as to close the steam-port or shut off steam at every revolution.

When the bar A descends, it forces down the arm $f'$, and closes the exhaust-port.

Figure 3:
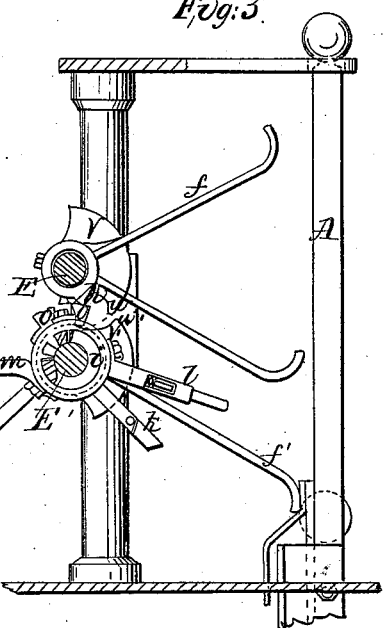
Figure 3 shows the stop-device arranged in a different position from that shown in fig. 1.

As seen in fig. 3, both ports are closed, and the valves will remain motionless.

To produce this locking or stoppage of the steam-valve, I attach a wheel to the rock-shaft E'.

This wheel is marked $i$.

Upon one side of it there are two arms, $k$ and $l$, and upon the other side there is an arm, $m$, which is attached to the plunger of a dash-pot, N.

On the top part of the wheel $i$ there is an adjustable lug, $o$, with a notch in it, as seen, and on the rock-shaft E there is a cam, $p$, with an edge, which engages with the notch in $o$ when they are brought in contact.

The position of the wheel $i$ on the rock-shaft is controlled by the action of the tappets $c\ c'$ as they move up and down, and by the dash-pot N.

The arm $k$ is jointed at its outer end, as seen at $q$, so that as the tappet C strikes it in rising, the end turns up without moving the arm.

When the bar descends, the tappet C will strike $k$, and partially turn the wheel and slip past, but not before it has raised the plunger in the dash-pot by the partial revolution of the wheel $i$.

The plunger gradually settles in the dash-pot, and turns the wheel gradually back and the arms upward, while the tappet $c'$ is descending.

If, from any cause, the bar A descends too fast, as, for instance, from the lack of resistance to the pump-bar, or from any other cause, the tappet $c'$ will strike the arm $l$ and turn the wheel $i$, so that the cam $p$ on the rock-shaft E will lock into the notch on the lug $o$, and thereby hold the steam-valve closed, as seen in fig. 3.

The engine consequently stops, and remains so until the engineer liberates the arm $f$.

When the pump is running at proper speed, the motion is such that the tappet $c$ will not strike the arm $l$ with force enough to turn the wheel, as time will be given for the plunger $r$ to fall and turn the wheel sufficiently to raise the arm out of the way of the tappet.

Should it strike the end of the arm slightly, the end is made flexible by a spiral spring, so that it will give, and allow the tappet to pass.

An enlarged detached view of the end of this arm is seen at $l'$, fig. 1.

The time given to allow the arm to rise depends upon the quantity of water in the dash-pot N.

This quantity is controlled by a valve, which is operated by the screw S.

The rock-shafts are partially revolved by weights, $t\ t$, or brought back by weights when partially revolved by the arms $f f'$.

Figure 2:
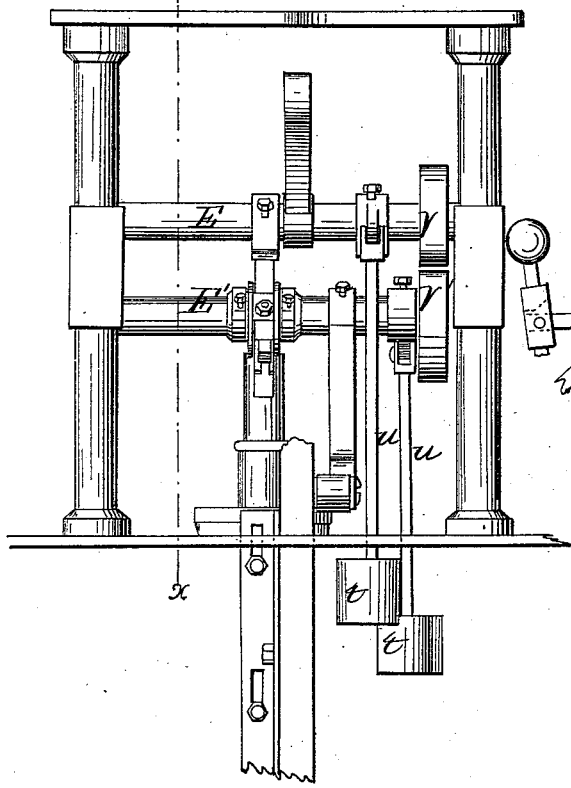
Figure 2 is a front elevation.

These weights are attached to rods, $u$, fig. 2, and the rods are attached to short arms on the shafts, as seen in the drawing.

On the rock-shafts are two segments of circles, $v\ v'$.

The points $w\ w'$ are brought in contact with each other as the shafts are turned.

When the pump is working regularly, the arm $f'$ is depressed or brought down by a roll on the side of the bar A.

This roll is seen in dotted line at $y$, fig. 3.

When thus depressed, the rising of the bar A raises the arm $f$, and liberates the point $w$, so that the weight $t$ operates on the shaft, and, by partially revolving it, throws up the arm $f'$, and thereby opens the exhaust-port of the engine.

When the other segment is turned up, the same movement takes place.

The other weight will operate upon the other shaft in the same manner.

The points of the two segments slip past each other, thus allowing the weights to act alternately upon the shafts.

It will be seen that, by this arrangement, a perfect stop-motion is furnished, and that the engine must stand still, after the valve is closed, until the engineer is ready to start it again.

The advantages of this arrangement are many and obvious, and will be understood and appreciated by those who are acquainted with this class of machinery.

I claim as new, and desire to secure by Letters Patent—

1. The construction of the cam $p$, lug $o$, wheel $i$, arms $k\ l$, and tappets $c\ c'$, substantially as herein shown and described.

2. In combination with the cam $p$, lug $o$, wheel $i$, arms $k\ l$, and tappets $c\ c'$, the arms $f f'$, strap $h$, rod A, segments $v\ v'$, and plunger $r$ of the dash-pot, as herein shown and described.

The above specification of my invention signed, this 27th day of May, 1868.

GEORGE W. PERRY.

Witnesses:
 FRANK BLOCKLEY,
 ALEX. F. ROBERTS.